United States Patent [19]

Minaki et al.

[11] Patent Number: 5,148,210
[45] Date of Patent: Sep. 15, 1992

[54] AUTOMATIC FOCUSING APPARATUS

[75] Inventors: Takashi Minaki; Yukinori Koizumi; Masashi Saito, all of Hachioji, Japan

[73] Assignee: Konica Corporation, Tokyo, Japan

[21] Appl. No.: 665,783

[22] Filed: Mar. 7, 1991

[30] Foreign Application Priority Data

Mar. 29, 1990 [JP] Japan .................................. 2-81829

[51] Int. Cl.⁵ ............................................. G03B 13/36
[52] U.S. Cl. .................................... 354/403; 354/402
[58] Field of Search ............... 354/402, 403, 406, 407, 354/408; 356/4

[56] References Cited

U.S. PATENT DOCUMENTS 4,384,199  5/1983  Ogino et al. ............................ 356/4
4,490,037  12/1984  Topoulos et al. ................... 354/403

Primary Examiner—Russell E. Adams
Attorney, Agent, or Firm—Frishauf, Holtz, Goodman & Woodward

[57] ABSTRACT

An automatic focusing device for driving an optical system to focus on a subject. The device has a CCD to read an image of the subject, a driver for the CCD so that a first image signal is outputted from the CCD in a normal direction and a second image signal is outputted from the CCD in a reversal direction, the optical system to form the image on the CCD, and a controller to control the optical system in accordance with the first image signal and the second image signal so that the optical system forms the image on the CCD in focus.

5 Claims, 11 Drawing Sheets

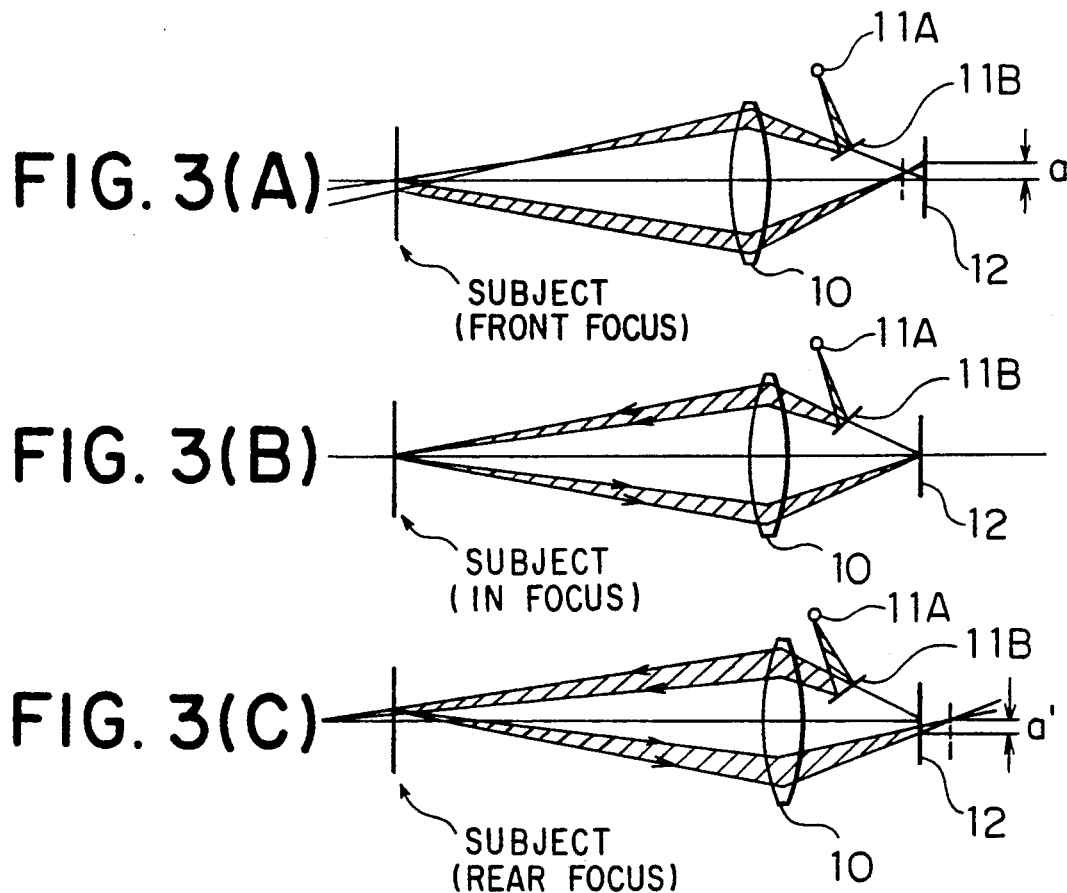
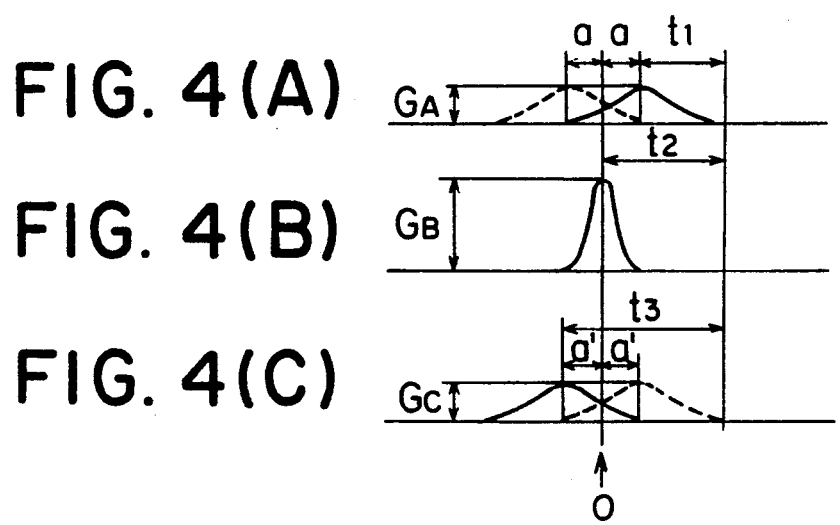

t1 − t2 < 0 t1 − t2 > 0

FIG. 8(A)   FIG. 8(B)   FIG. 8(C)
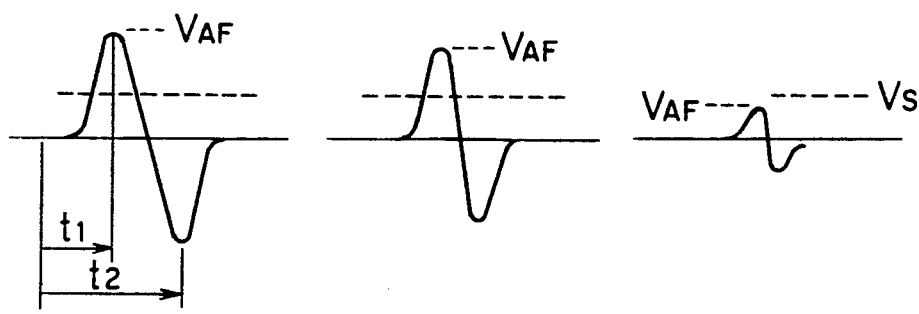
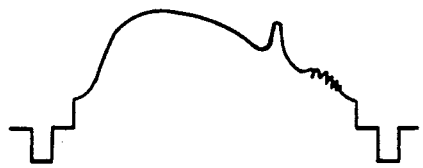
FIG. 9(A) Y SIGNAL
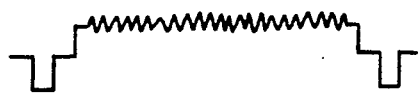
FIG. 9(B) C SIGNAL
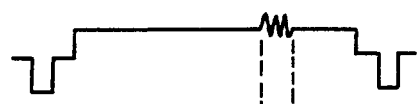
FIG. 9(C) C SIGNAL AFTER THROUGH PHASE FILTER
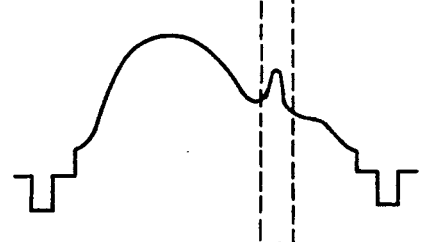
FIG. 9(D) Y SIGNAL AFTER THROUGH LPF
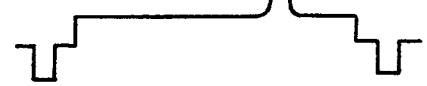
FIG. 9(E) AF SPOT SIGNAL

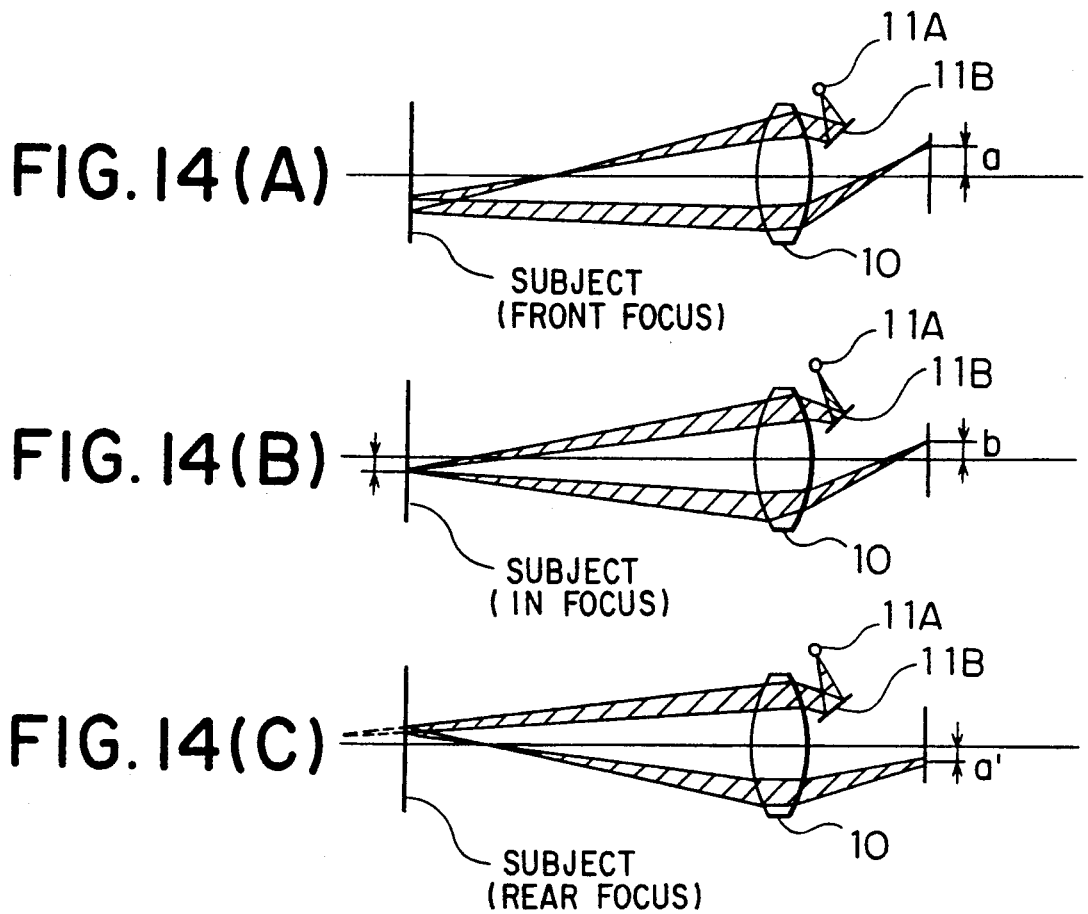
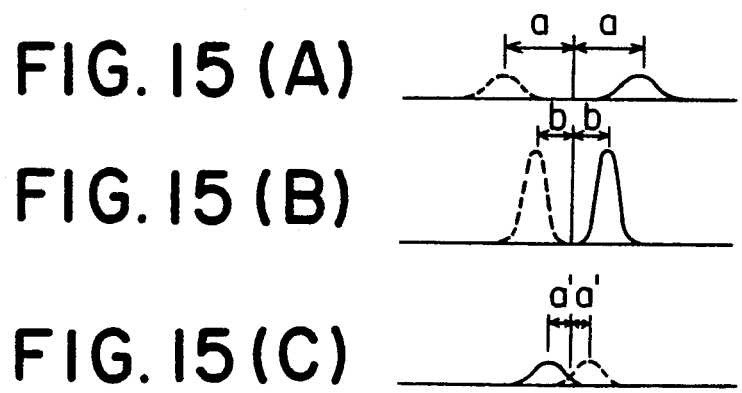

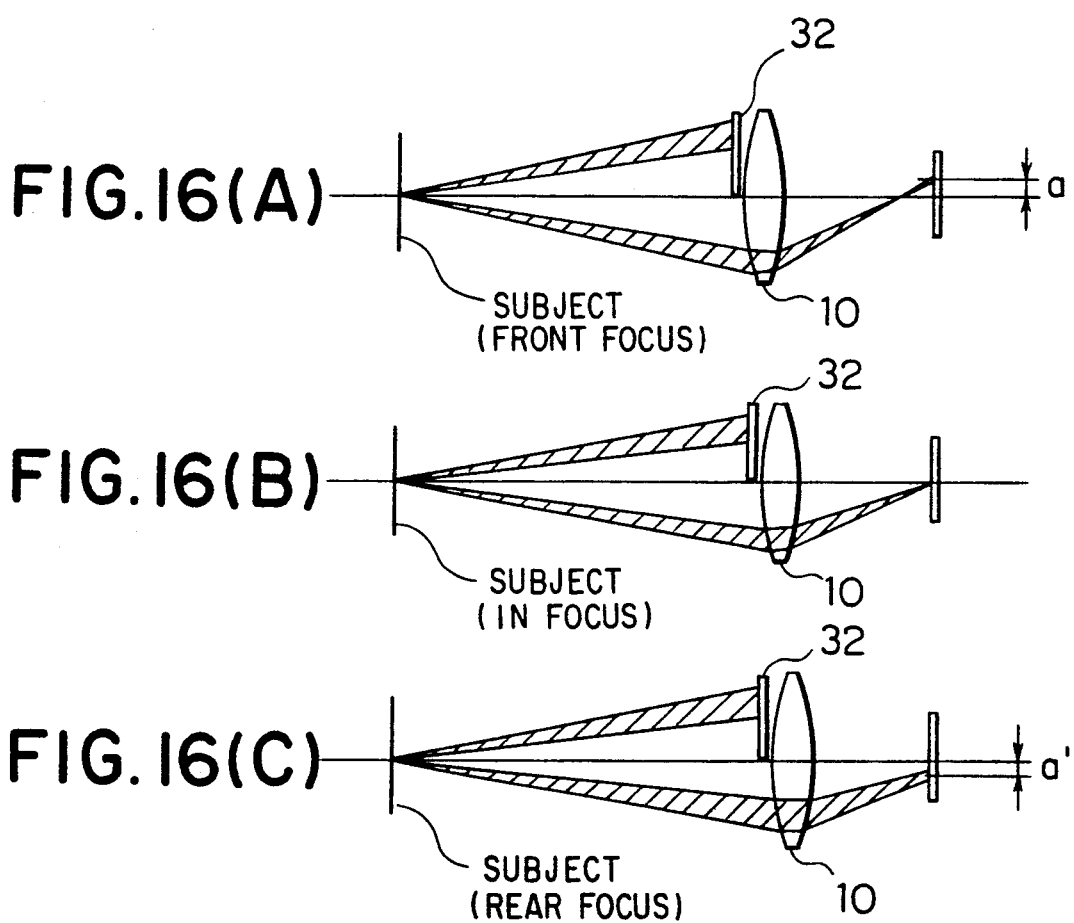

AUTOMATIC FOCUSING APPARATUS

BACKGROUND OF THE INVENTION

The present invention relates to a high-speed and highly accurate automatic focusing apparatus.

An automatic focusing method is roughly divided into two methods one is a passive method and the other is an active one. Among these methods, an infrared active method has been becoming popular rapidly for a camera of a lens shutter type. The reason behind this is that an automatic focusing function works effectively even in a dark place and it is not affected by the contrast and pattern of a subject. In addition to that, the infrared active method is relatively simple in terms of operation and is more advantageous in terms of cost than other methods.

FIG. 17 shows a principle of an infrared active phase difference method. In this method, a projector lens emitted from infrared LED 1 is projected through projector lens 2 on subject 3. Reflected light from subject 3 is received by photoreceptor lens 4 and then is led thereby to sensor 5 composed of quartered SPD. In this case, the position of sensor 5 for receiving light changes depending upon the distance between a camera and a subject. Therefore, the difference in position of the sensor for receiving light tells a camera-to-subject distance.

However, this infrared active phase difference method has its disadvantage that a parallax is caused because a range-finding portion (including infrared LED 1, projector lens 2, photoreceptor lens 4 and sensor 5) is seperated from a camera lens.

On the other hand, FIG. 18 represents a diagram showing a principle of an infrared active method of a TTL type developed for improving aforesaid disadvantage of the infrared active phase difference method. In this method, infrared light from infrared LED 1 is reflected on beam splitter 6 and is transmitted by lens system 7 to arrive at subject 3. Reflected light from subject 3 is condensed by photoreceptor lens 8 to be led to photoreceptor sensor 9 which is illustrated in detail in FIG. 19. In this case, a movement of photoreceptor sensor 9 causes a quantity of accepted light at image-forming spot 9c to be the maximum. The position of photoreceptor sensor 9 in this case tells a camera-to-subject distance. In this method, no parallax is caused because infrared light for range-finding is projected from a camera lens, which is an advantage.

However, a photoreceptor portion for range-finding (including a photoreceptor lens and a photoreceptor sensor) is required, which prevents a camera from being compact size and low cost. In addition to that, a scope of range-finding is very narrow because a projecting point of infrared light is constantly fixed, therefore, the range-finding for the outside of an irradiation angle of infrared light is impossible, which is a disadvantage.

SUMMARY OF THE INVENTION

The invention has been devised to solve aforesaid problems and its object is to realize an automatic focusing apparatus wherein no exclusive photoreceptor portion for range-finding is provided, range-finding with simple structure is possible and a range-finding point can be set at any position.

The invention for solving aforesaid problems is characterized in that a charge coupled device capable of driving by changing the direction of charge transfer to the normal direction or to the reverse direction, an optical system for forming an image of a subject on the charge coupled device, a light projecting means for projecting light on a subject through the optical system, a transfer switching means that drives by changing a charge transfer direction of the charge coupled device, and an operation circuit with which a focusing point of the optical system is obtained through the phase difference of image output of the charge coupled device are provided therein.

In an automatic focusing apparatus of the invention, light projected from a light projecting means arrives at a subject after passing through an optical system is reflected on the subject and passes through the optical system again, resulting in image-forming on a charge coupled device. A transfer direction of the charge coupled device is changed to its normal direction or its reverse direction and a focusing point can be obtained through the phase difference of output of the charge coupled device whose transfer direction has been changed.

BRIEF DESCRIPTION OF THE DRAWINGS

FIG. 3 is a diagram for illustrating the operation state in the example of automatic focusing apparatus of FIG. 1, FIG. 4 is a diagram for illustrating the image-forming state in the example of automatic focusing apparatus of FIG. 1, FIG. 8 is a diagram for illustrating the detailed operation state for detecting the focused condition in the example of automatic focusing apparatus in FIG. 1, FIG. 9 is a diagram for illustrating the state under which AF spot signals are produced in the example of automatic focusing apparatus in FIG. 1, FIG. 14 is a diagram for illustrating the operation state in the more different example, FIG. 15 is a diagram for illustrating the image-forming state in the example of automatic focusing apparatus in FIG. 14, FIG. 16 is a diagram for illustrating the operation state in the still more different example of automatic focusing apparatus.

DETAILED DESCRIPTION OF THE INVENTION

Figure 1:
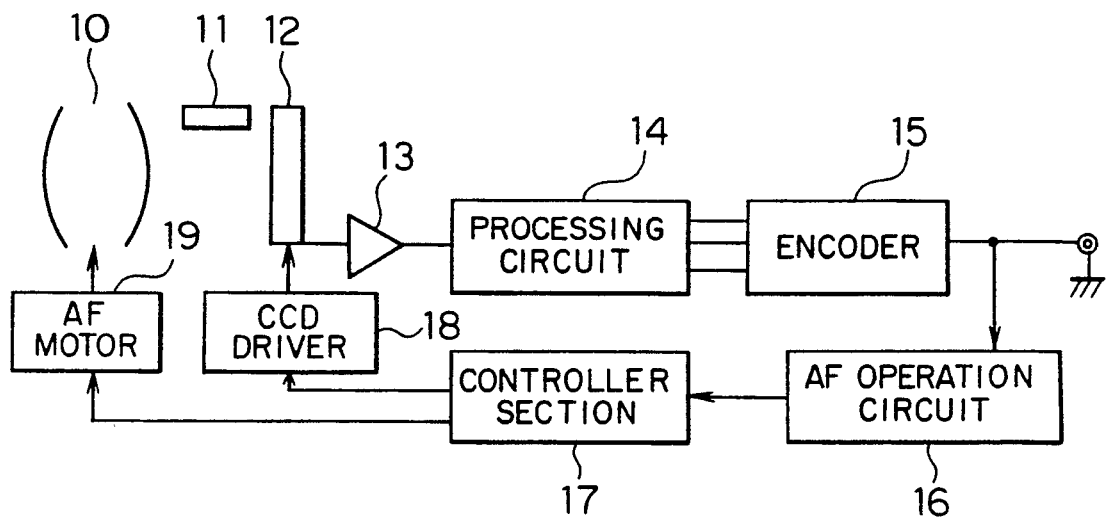
FIG. 1 is a block diagram showing the constituent of an automatic focusing apparatus that is one example of the invention.

Examples of the invention will be explained in detail as follows, referring to the drawings.

FIG. 1 is a block diagram showing a rough constituent of an example of the invention.

In the figure, the numeral 10 represents an optical system for projecting a spotlight for AF on a subject and for leading an image of the subject to an image-forming plane, the numeral 11 is a light-projecting means for projecting a spotlight for AF through optical system 10, and 12 is a CCD as a charge coupled device for receiving an image of the subject. This CCD 12 is capable of being switched in terms of its horizontal transfer direction from side to side, which will be explained later in detail. The numeral 13 is an amplifier for receiving an image output from CCD 12, the numeral 14 is a process circuit that generates brightness (Y) signals and color difference (R-Y, B-Y) signals both from an image output of CCD 12, the numeral 15 is an encoder that generates composite video signals (hereinafter referred simply to video signals) from brightness signals and color difference signals, 16 is an AF operation circuit that receives video signals, conducts AF operation and generates focus error signals, 17 is a control portion that conducts drive-control of CCD 12 and receives focus error signals for conducting AF control, 18 is a CCD driver organizing a transfer switching means that conducts normal/reverse transfer driving based on the control of control portion 17, the numeral 19 is an AF motor that makes optical system 10 to conduct focusing through the control from control portion 17.

Figure 2:
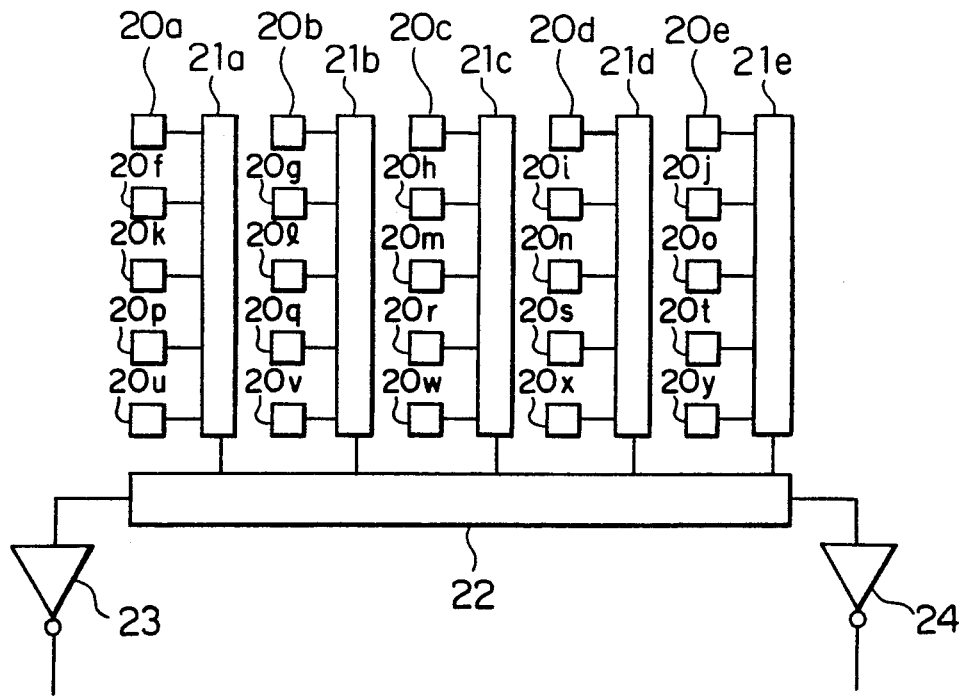
FIG. 2 is a block diagram of CCD used in the example of automatic focusing apparatus shown in FIG. 1.

FIG. 2 is a block diagram showing rough structure of CCD 12 used in the present example. In this case, an occasion of 5-5 pixel CCD. Namely, photoreceptor portions 20a-20y in quantity of 5-5, a transfer gate that controls timing for transmitting charges of each of photoreceptor portions 20a-20y, vertical transfer CCDs 21a-21e in 5 rows which transmit longitudinally the charges of 5 photoreceptors, horizontal transfer CCD 22 that transmits horizontally the charges from vertical transfer CCDs 21a-21e in 5 rows, reading amplifier 23 that reads the signal charges under a normal condition, and reading amplifier 24 that transmits horizontal transfer CCD 22 in the reverse direction and reads signal charges are provided. Therefore, it is possible to change the horizontal reading direction by switching the direction for driving horizontal transfer CCD 22 of CCD 12. This can be done simply by changing slightly the phase of a pulse that drives horizontal transfer CCD 22 from CCD driver 18. Though an occasion of interline CCD (IT - CCD) is shown in FIG. 2, FIT -CCD can also conduct the same operation.

FIG. 3 is a diagram illustrating a principle of operation for focusing in the present example. Light emitted from light emitting element 11A that forms a part of light projecting means 11 is reflected on mirror 11B that equally form light projecting means 11 and arrives at a subject after passing through optical system 10. In this case, due to the reflection on mirror 11B, irradiating light from light emitting element 11A is equivalent to one irradiated from the center of optical axis on an image pick-up plane. Here, FIG. 3 (A) shows the so-called front focus (focused on the front of a subject), FIG. 3 (B) shows the stated of in-focus and FIG. 3 (C) shows the so-called rear focus (focused on the rear of a subject).

Further, FIGS. 4 (A), (B) and (C) show the states of image signals each corresponding to one scanning line under the condition that light projected respectively from light projecting means 11 under the states of FIGS. (A), (B) and (C) are reflected on a subject are received by CCD 12. In FIG. 4, an output from CCD 12 in the case that horizontal transfer CCD 22 is transmitted in the normal direction (hereinafter referred to as normal transfer) is shown by solid lines, while, an output from CCD 12 in the case that horizontal transfer CCD 22 is transmitted in the reverse direction (hereinafter referred to as reverse transfer) is shown by dashed lines.

With regard to an output of CCD 12 in the state of front focus in FIG. 3 (A), the phase for normal transfer is $t_1$, and that for reverse transfer is $t_1+2a$ as shown in FIG. 4 (A). Namely, compared with CCD output in normal transfer, CCD output in reverse transfer is behind by $2a$ (the phase is deviated).

With regard to an output of CCD 12 in the state of in-focus in FIG. 3 (B), the phases of both normal transfer and reverse transfer are $t_2$ as shown in FIG. 4 (B). Namely, no deviation of phase is caused between CCD output in normal transfer and that in reverse transfer.

With regard to an output of CCD 12 in the state of rear focus in FIG. 3 (C), the phase for normal transfer is $t_3$ and that for reverse transfer is $t_3-2a$ as shown in FIG. 4 (C). Namely, compared with CCD output in normal transfer, CCD output in reverse transfer is ahead by $2a$ (the phase is deviated).

Further, a signal level of CCD output in FIG. 4, when observed, tells that the level is highest ($G_B$ in FIG. 4 (B)) in the state of in-focus. In the case of out of focus, on the other hand, the signal level of CCD output is low ($G_A$ and $G_C$ in FIGS. 4 (A) and (C))

From the foregoing, the phase difference between normal transfer and reverse transfer both of CCD output judges whether the focusing is front focusing or rear focusing, thus, the direction for driving AF motor 19 is decided. Whether the focusing is an in-focus state or not is judged by both signal level of CCD output and phase difference.

Figure 5:
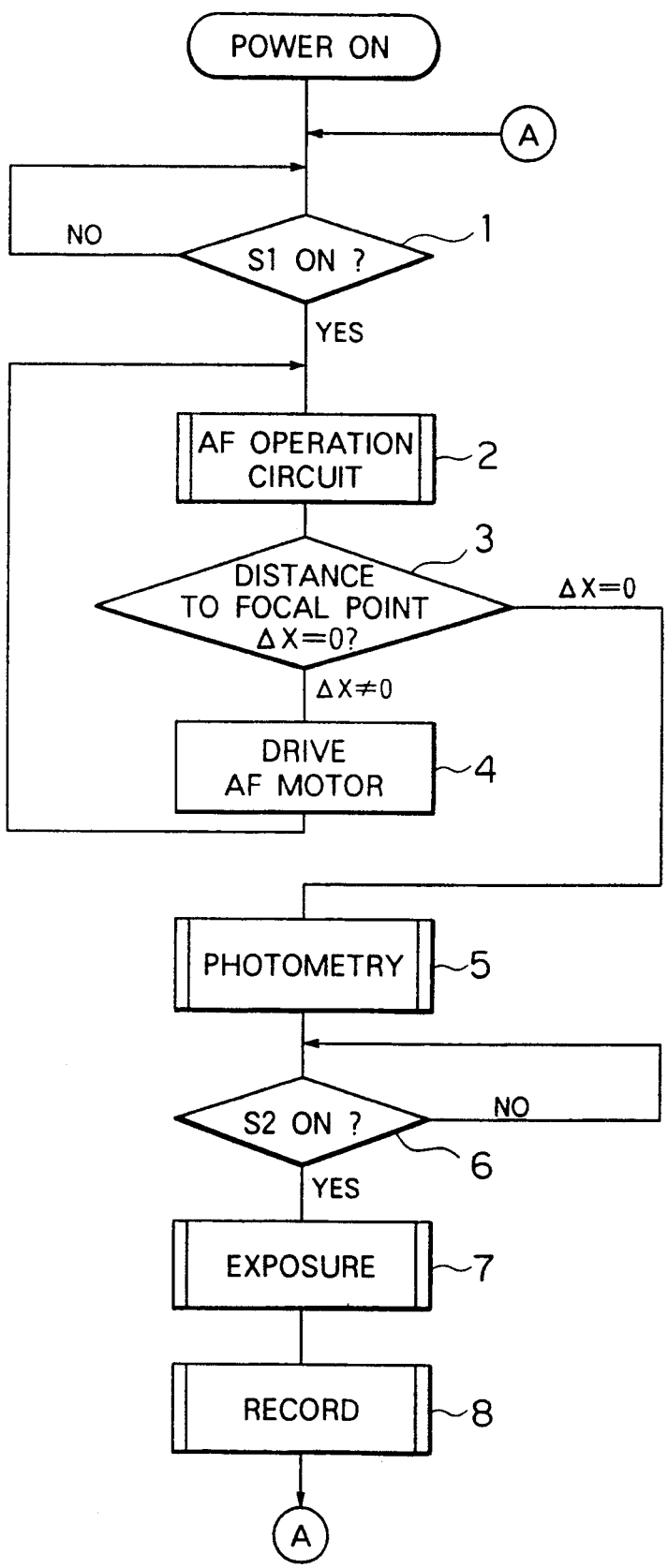
FIG. 5 is a flowchart for illustrating the outline of operation state in the example of automatic focusing apparatus in FIG. 1.
Figure 6:
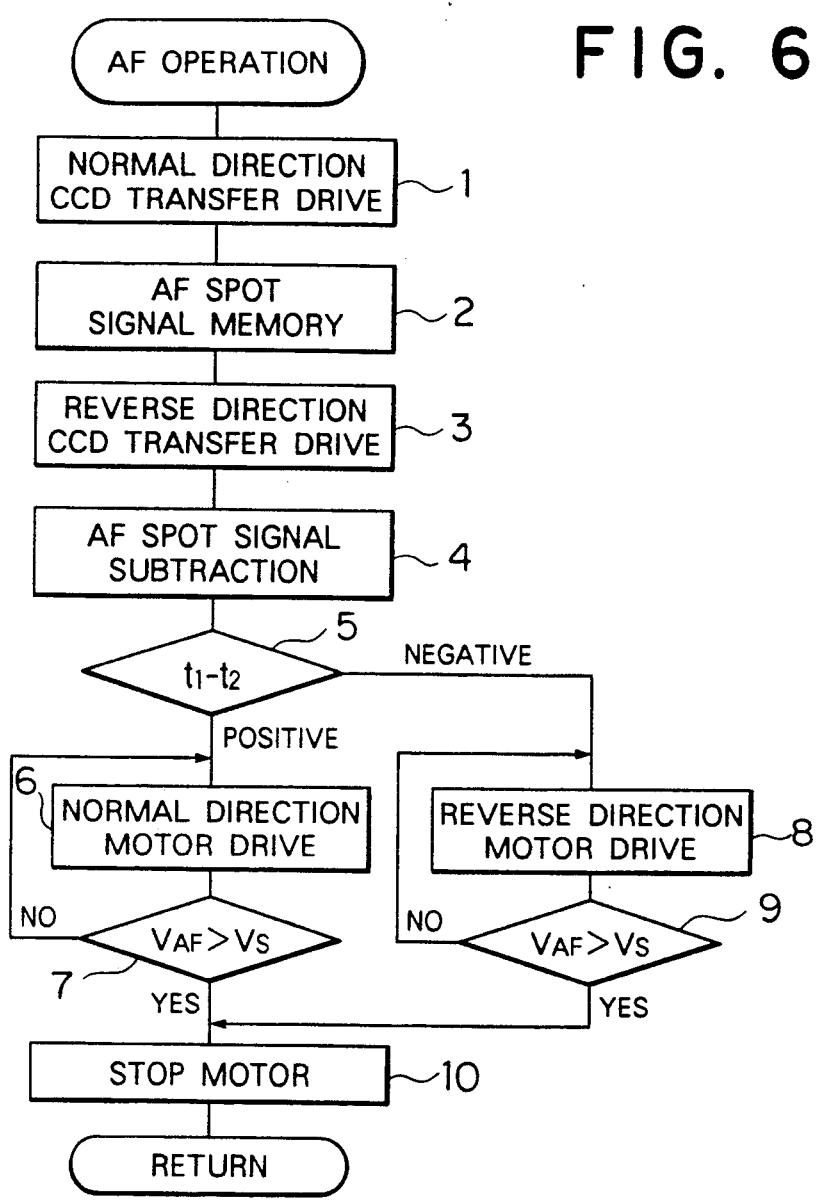
FIG. 6 is a flowchart for illustrating the detailed operation state in the example of automatic focusing apparatus in FIG. 1.

Referring to a camera main flow in FIG. 5 and AF operation routine in FIG. 6, an explanation of the total operation will be given as follows. Incidentally, the AF operation will be explained with an example of a still video camera.

Until the time when the first step S1 of a 2-step release switch is pressed, the camera is kept in stand-by state (step 1). In this case, when S1 is pressed, an AF operation routine is started (step 2). In this AF operation routine, a focusing state (front focusing/rear focusing/in-focus) is detected by the phase difference of image signals in normal/reverse transfer and signal level. Incidentally, the routine will be explained in detail, later. The AF motor is driven (step 4) until the distance to focal point Δx detected by the AF operation is reduced to zero (step 3). After Δx has been reduced to zero, photometry is started (step 5). Then, a stand-by state is kept (step 6) until the second step S2 of the release switch is pressed down, and after S2 has been pressed down, exposure (step 7) and recording (step 8) are executed. The foregoing is a total operation.

Figure 7:
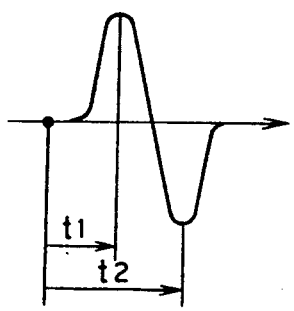
FIG. 7 is a diagram for illustrating the detailed operation state for detecting a focusing point in the example of automatic focusing apparatus in FIG. 1.
Figure 7:
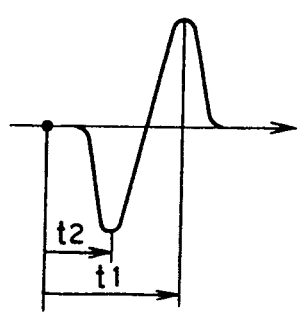

Next, AF operation will be explained in detail as follows, referring to FIG. 6. First, CCD 12 is driven (step 1) so that the transfer in the normal direction is conducted. Then, the AF spot signals of CCD 12 output in this case are stored (step 2) on a field memory in AF operation circuit 16. After that, CCD 12 is driven (step 3) so that the transfer in the reverse direction is conducted. Then, subtraction between AF spot signals of CCD output obtained from transfer in the normal direction (to be read from the field memory) and those obtained from transfer in reverse direction is conducted (step 4). The results of subtraction in this case is shown in FIG. 7. In the figure, when $t_1$ represents a time period from a reference time to the time when the result of subtraction shows its maximum value, and $t_2$ represents a time period from a reference time to the time when the result of subtraction shows its minimum value, judgment whether the focusing is front focusing or it is rear focusing is made by whether a value of $t_1-t_2$ is positive or negative. In this way, the focusing state is judged (step 5) through the further subtraction between the maximum value and the minimum value of subtraction results of AF spot signals. When $t_1-t_2$ is positive, AF motor is driven to run, for example, in the normal direction (step 6) to eliminate the state that $t_1-t_2$ is positive. When $V_{AF}$ represents the maximum value in the results of subtraction of CCD output, the maximum value $V_{AF}$ that is equal to or lower than the prescribed value $V_S$ tells that the focusing is in the state of in-focus. Therefore, the motor is kept to run as long as the relation of $V_{AF} > V_S$ is kept (step 7). After the state of focusing has been judged to be in-focus, the motor is stopped.

Further, when $t_1-t_2$ is negative, AF motor is driven to run, for example, in the reverse direction (step 8) to eliminate the state that $t_1-t_2$ is negative. The motor keeps running (step 9) as long as the relation of $V_{AF}-V_S$ is kept. After the state of focusing has been judged to be in-focus, the motor is stopped.

FIG. 8 shows the state of change in subtraction results of AF spot signals caused by driven AF motor. FIG. 8 (A) represents the moment when the focusing is judged to be front focusing. As the motor is driven and thereby the focusing approaches to the in-focus state, the value of $V_{AF}$ is gradually reduced and the difference between $t_1$ and $t_2$ is concurrently reduced (FIG. 8 (B)). When the value of $V_{AF}$ becomes smaller than the prescribed value $V_S$ (FIG. 8 (C)), the state of focusing is judged to be in-focus, and the motor is stopped. Incidentally, the smaller the value of $V_S$ is, the higher the accuracy of AF is.

Further, when the rising signals or descending signals obtained by differentiating CCD output used for judgment of front focus/rear focus or in-focus are used, the width of a signal is small and therefore the accuracy is improved.

Now, a method for extracting AF spot signals of visible light included in CCD output from disturbance light (visible light) component will be explained as follows, referring to FIG. 9.

FIG. 9 (A) represents Y (brightness) signals for one field obtained from CCD output, and its amplitude represents brightness. FIG. 9 (B) represents C (color) signals, and the phase difference from color sub-carrier wave represents a hue. Now, when C signals are filtered with a hue filter corresponding to a color of light irradiated from light-emitting element 11A, signals only for the area of AF spot are obtained as shown in FIG. 9 (C). Then, when Y signals (FIG. 9 (D)) after through LPF for eliminating high-frequency noises and for eliminating high-frequency components having a spot width greater than the minimum spot width are gated by C signals after through phase filter, AF spot signals only are obtained as shown in FIG. 9 (E).

In the arrangement stated above, it is possible to conduct accurate and prompt AF of a TTL system only by adding light-projecting means 11.

Figure 10:
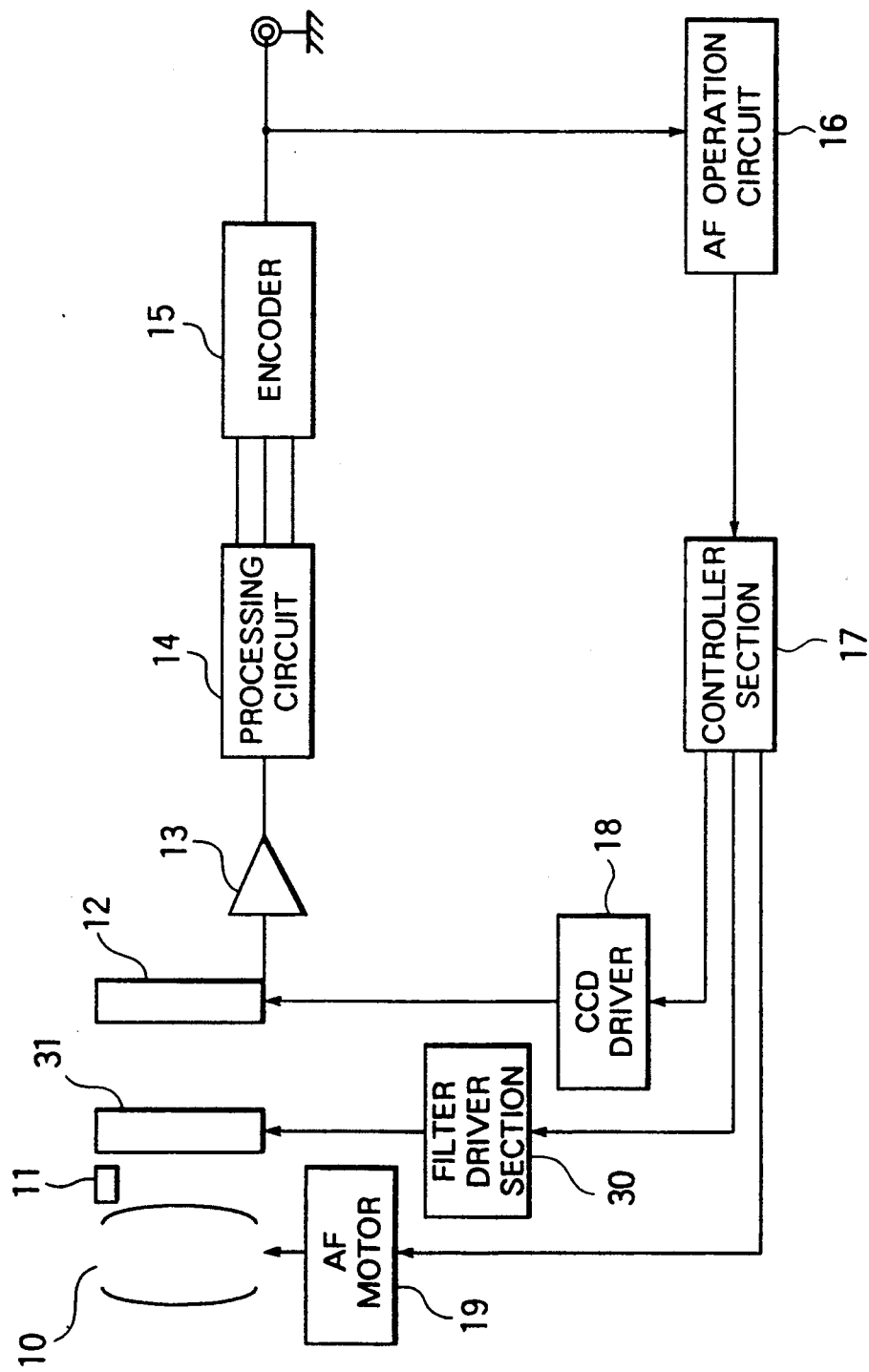
FIG. 10 is a block diagram showing the structure of other example of the invention.

Next, an example wherein light-projecting means 11 irradiates infrared light will be explained. A subject includes various colors and brightness, and some times, active range-finding by means of visible light does not work. In that case, it is also possible to cause light-projecting means 11 to irradiate infrared light. FIG. 10 is a block diagram showing a rough constitution of an example wherein infrared light is used for illumination. In the diagram, items identical to those in FIG. 1 are given the same number and explanation thereof will be omitted. Those differ from FIG. 1 include that light-projecting means 11 irradiates infrared light and there are provided filter-driving portion 30 that drives a filter and filter 31 that is driven by the filter-driving portion 30. The filter 31 is composed of an infrared-transfer filter and an infrared-cutting filter both can be used alternately, and the infrared-transfer filter is selected to be used for range-finding and the infrared-cutting filter is selected for normal exposure both by the filter-driving portion 30 which selects them selectively. Generally, CCD has photosensitivity covering up to infrared zone and an infrared-cutting filter is used for a normal exposure. In the present example, therefore, infrared light is used for photometry to avoid an influence of disturbance light such as visible light. In such an example, it is not necessary to extract AF spot by gating with C signals as in aforesaid FIG. 9.

Figure 11:
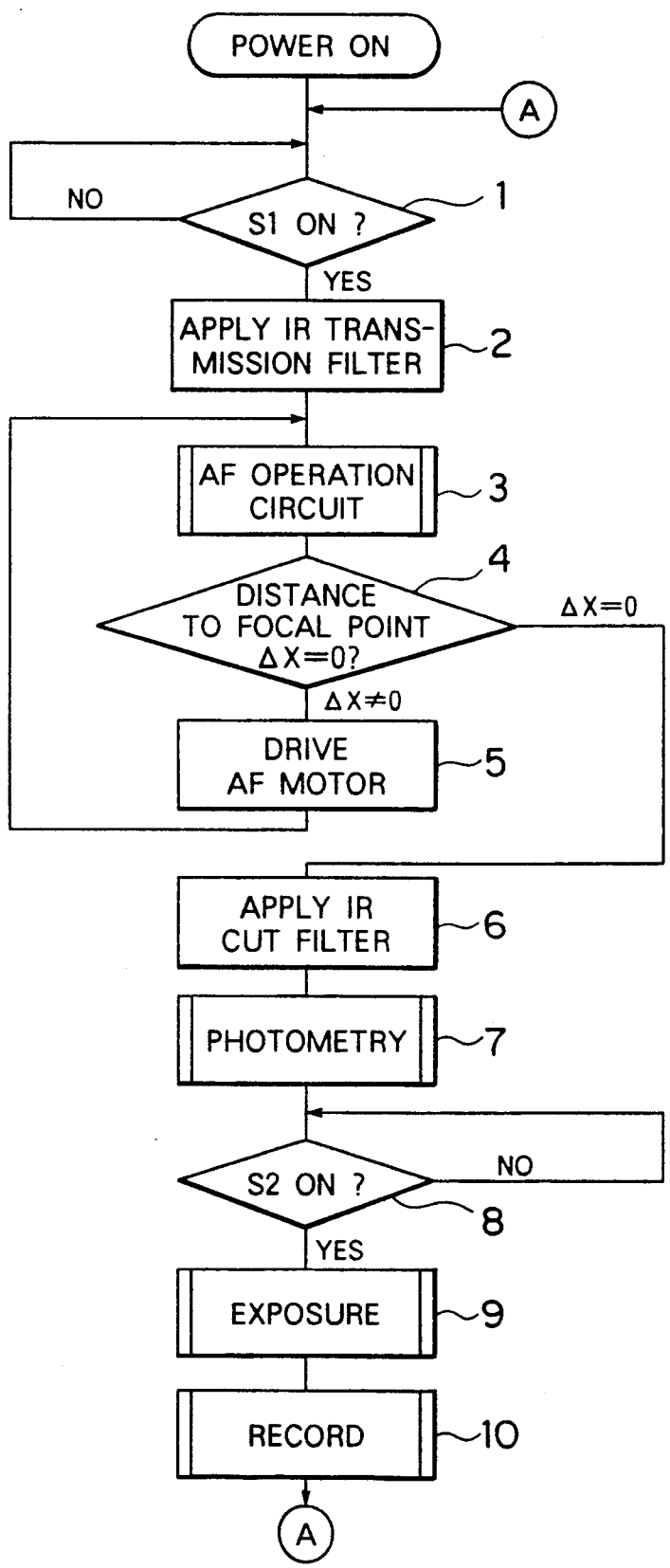
FIG. 11 is a flowchart for illustrating the outline of operation state in the example of automatic focusing apparatus in FIG. 10.

FIG. 11 is a flowchart showing rough operation in the present example. Those differ from operation in the first example shown in FIG. 5 include that an IR (infrared light)-transfer filter is inserted (step 2) before AF operation, and an IR-cutting filter is inserted (step 6) after completion of AF operation. During a period of range-finding; therefore, infrared light irradiated from light-projecting means 11 alone passes through filter 31 (IR-transfer filter) and arrives at CCD 12. Therefore, accurate range-finding can be performed by detecting AF spot by means of infrared light from Y signals of output from CCD 12. Further, in case of exposure, unnecessary infrared rays are cut by filter 31 (IR-cutting filter) and normal exposure can be conducted.

Figure 12:
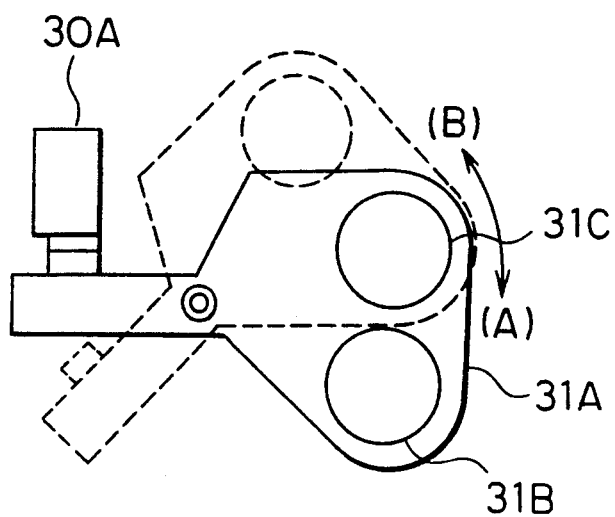
FIG. 12 is a block diagram showing the constituent of primary parts used in the example of automatic focusing apparatus in FIG. 10.
Figure 13:
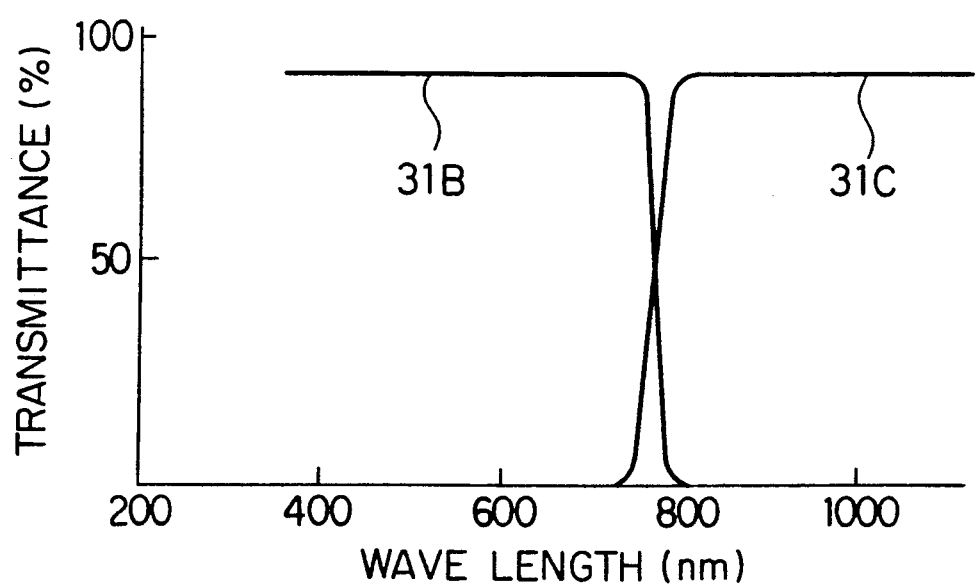
FIG. 13 is a block diagram showing the characteristics of a filter used in the example of automatic focusing apparatus in FIG. 10.
Figure 17:
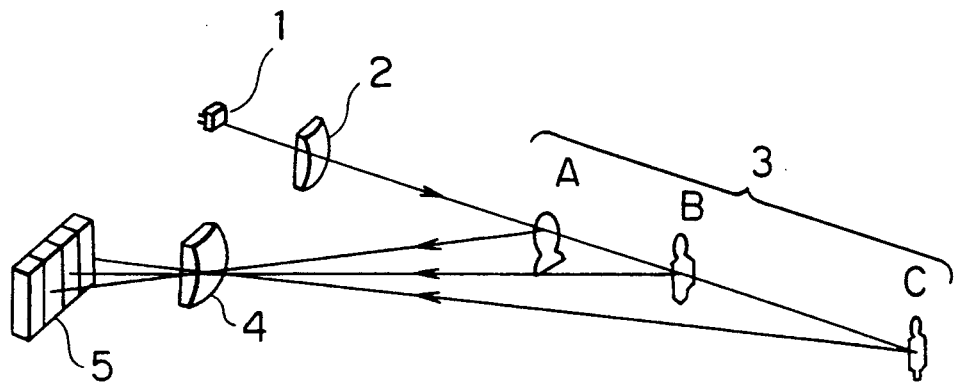
FIG. 17 is a block diagram showing the rough structure of a conventional automatic focusing apparatus.
Figure 18:
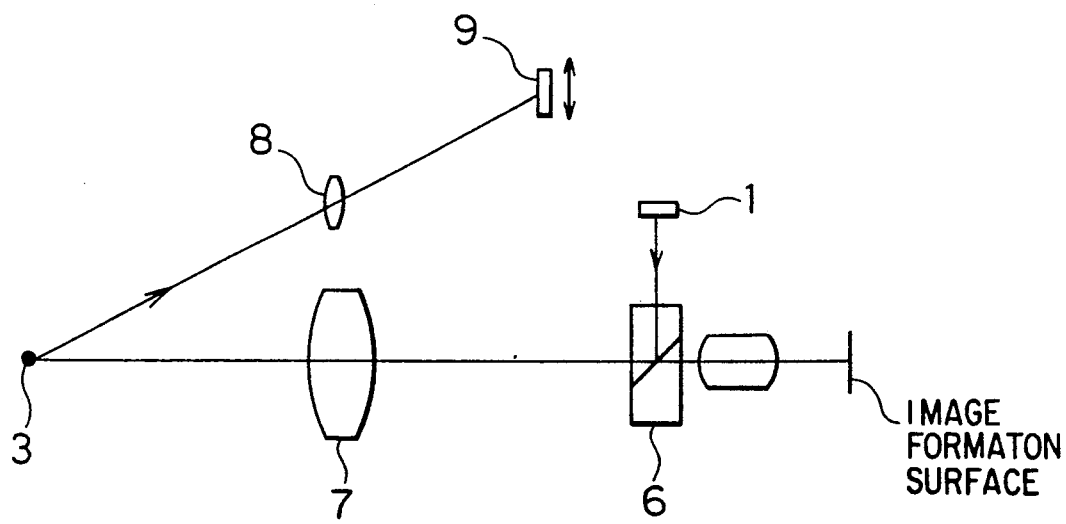
FIG. 18 is a block diagram showing the structure of other example of the conventional automatic focusing apparatus.
Figure 19:
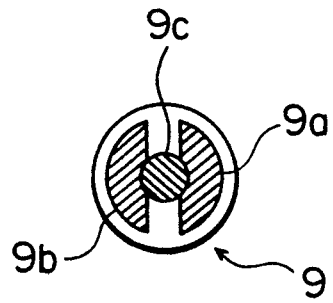
FIG. 19 is a block diagram showing in detail the structure of a photoreceptor sensor used in the automatic focusing apparatus shown in FIG. 18.

FIG. 12i is a block diagram showing primary portions of both filter 31 and filter-driving portion 30. IR-cutting filter 31B and IR-transfer filter 31C both provided on filter frame 31A are driven by plunger 30A constituting filter-driving portion 31 and by an unillustrated spring. In FIG. 12 (A), IR-transfer filter 31C is set, while in FIG. 12 (B), IR-cutting filter 31B is set. Incidentally, the constitution other than this can also be applied to the present example if two kinds of filters can be switched instantly. Incidentally, FIG. 13 represents a characteristic diagram showing the transfer characteristics of both IR-cutting filter 31B and IR-transfer filter 31C. By using filters of such characteristics, normal exposure and photometry by means of infrared light can be conducted without using an exclusive photoreceptor element.

Incidentally, the detection of AF spot signals can be done from a specific single horizontal scanning line, but it can also be done after adding plural horizontal scanning lines in succession and averaging them. When such addition and averaging are done, noise components are reduced due to correlation between horizontal scanning lines, and an SN ratio is improved, which is an advantage. Incidentally, when infrared light is used, a focal point is deviated slightly from that of visible light, but this may be corrected by adjustment of optical thickness of a filter or electrical phase of AF spot signals.

As stated above, photometry can satisfactorily be conducted even when infrared light is projected from light-projecting means 11.

Next, explanation will be made for the occasion when the location other than the center of a viewfinder is projected. In an ordinary AF camera, automatic focusing has been performed at the center of a viewfinder frame. However, a subject to be photographed is not necessarily located at the center of the viewfinder frame. The present example, therefore, is devised so that the automatic focusing may be conducted at any location in the viewfinder frame. FIG. 14 is an explanatory diagram showing an occasion wherein automatic focusing is conducted at the location deviated from the center by the distance B. The method to achieve this is to adjust an inclined angle of mirror 11B. FIG. 14 (B) shows the state of in-focus wherein the distance B that is deviation from the center of the subject caused by inclined angle θ of mirror 11B is proportional to deviation b on the image pickup plane, and they can be obtained through calculation. As shown in FIG. 15 (B), therefore, deviation by 2b of CCD output caused by normal direction transfer and reverse direction transfer is an original state of in-focus. An operation for judging the state of focusing whether it is front focusing (FIG. 15 (A)) or rear focusing (FIG. 15 (C)) based on a phase difference of CCD output is the same as that in aforesaid example except that deviation of 2b in the state of in-focus is taken into consideration.

FIG. 16 is an explanatory diagram showing illustratively the occasion of applying to a passive method. In this case, light-shielding plate 32 is provided in front of optical system 10 so that the complementary half of a beam of light about the optical axis thereof can pass through. The image-forming state in this case is identical to those shown in FIGS. 13 and 14. Incidentally, the condition in this case is limited to the occasion that a subject that is symmetrical laterally is located at the center of a viewfinder frame. Further, in this case, visible light can be used. It is therefore possible to apply to a passive method only by inserting light-shielding plate 32 in the arrangement of the example mentioned above.

As stated above in detail, the present invention is characterized in that a charge coupled device capable of driving by changing the direction of charge transfer to the normal direction or to the reverse direction, an optical system for forming an image of a subject on the charge coupled device, a light projecting means for projecting light on a subject through the optical system a transfer switching means that drives by changing a charge transfer direction of the charge coupled device, and an operation circuit with which a focusing point of the optical system is obtained through the phase difference of image output of the charge coupled device are provided therein. As a result, it is possible to realize an automatic focusing apparatus which is capable, despite an actual range-finding, of measuring the distance through a simple structure without providing an exclusive photoreceptor portion for measurement and is capable of setting a range-finding point at any location.

What is claimed is:

1. An automatic focusing apparatus for driving an optical means to focus on an object, comprising;
    means for reading an image of said object,
    means for driving said reading means so that a first image signal is outputted from said reading means in a normal direction and a second image signal is outputted from said reading means in a reversal direction,
    said optical means for forming said image on said reading means, and
    means for controlling said optical means in accordance with said first image signal and said second image signal so that said optical means forms said image on said reading means in focus.

2. The apparatus of claim 1, wherein said driving means further comprises means for switching said reading means so that said reading means outputs one of said first image signal and said second image signal.

3. The apparatus of claim 2, further comprising:
    means for projecting a light onto said object through said optical means to obtain a reflective image of said object so that said reading means reads said image from said reflective image.

4. The apparatus of claim 3, wherein said controlling means comprises means for processing said first image signal and said second image signal so as to generate a focus signal, and said controlling means controls said optical means in accordance with said focus signal so that said optical means forms said image on said reading means in focus, and
    said switching means switches said reading means so that said reading means alternatively outputs one of said first image signal and said second image signal in a predetermined condition.

5. The apparatus of claim 4, wherein said predetermined condition is stored in said controlling means.

* * * * *